United States Patent [19]

Hujer

[11] 3,976,376
[45] Aug. 24, 1976

[54] PROTECTING STRIPS OF PHOTOGRAPHIC FILM

[75] Inventor: Friedrich Hujer, Grunwald, Germany

[73] Assignee: AGFA-Gevaert, A.G., Leverkusen, Germany

[22] Filed: Sept. 18, 1975

[21] Appl. No.: 614,635

[30] Foreign Application Priority Data
Sept. 25, 1974 Germany............................ 2445830

[52] U.S. Cl................................ 355/133; 352/233; 355/40; 355/75
[51] Int. Cl.².......................................... G03B 1/00
[58] Field of Search ....................... 355/133, 40–42, 355/75; 352/232, 233, 236, 237; 353/26, 120, DIG. 2

[56] References Cited
UNITED STATES PATENTS
3,025,778   3/1962   Stuckens............................... 355/75
3,297,398   1/1967   Donofrio............................... 352/232

FOREIGN PATENTS OR APPLICATIONS
63,000   7/1968   Germany ............................ 355/40
1,497,471   6/1969   Germany ............................ 352/233

Primary Examiner—Joseph F. Peters, Jr.
Assistant Examiner—James LaBarre
Attorney, Agent, or Firm—Michael J. Striker

[57]                  ABSTRACT

A protected photographic film structure includes a strip of photographic film comprised of a series of frames, an information carrier strip secured to the strip of photographic film and running alongside the strip of film and bearing information concerning the printing order and/or the customer giving the printing order, and a pair of flexible protective strips each secured to the information carrier strip along the length of the information carrier strip at a respective one of the two faces of the information carrier strip. Each protective strip extends in direction from the information carrier strip towards the strip of photographic film and overlies and thereby protects a respective one of the two faces of the strip of photographic film. When the film strip structure travels along a predetermined path through a printing installation a device bends back the protective strips upstream of the printing station so that the strip of photographic film passes through the printing station uncovered by the protective strips.

7 Claims, 7 Drawing Figures

PROTECTING STRIPS OF PHOTOGRAPHIC FILM

BACKGROUND OF THE INVENTION

The invention relates to an expedient for protecting the frames of a strip of photographic film. The invention also relates to providing the strip of photographic film with markings, or the like, constituting information concerning the printing order and/or the customer giving the printing order.

Developing photographic films, particularly color negative films, are very easily scratched. The trend to employ exposure formats of smaller and smaller dimensions increases the danger that films will become damaged as a result of scratching. Additionally, the settling of dust upon the image-bearing surfaces of small-negative-format film is much more disturbing, in terms of the prints produced from such film, than is the case with films of larger negative format. Even if scratching of a film is avoided up to and during the making of prints from the film, the very high probability that the film will be scratched subsequently by the customer, after the return of the film to him, is of particular importance, since it is common for a customer to resubmit a film for the printing of further copies of selected pictures.

To avoid these difficulties, and furthermore to facilitate the systematic processing of large numbers of film strips, it is already known to make use of a transparent film wallet onto which is applied a strip of paper bearing an indication of the type of printing order involved, for example in the form of code perforations in the strip of paper. However, the coordination between the information on the information carrier and the various frames of the film is not assured because the film strip can slide inside the transparent wallet.

It is also known to directly apply to the film strip itself an information carrier bearing information readable by automatic means, to facilitate automatic printing and film strip handling operations. However, such information carriers do not in any way provide any protection for very delicate film.

SUMMARY OF THE INVENTION

It is a general object of the invention to provide an expedient for the protection of the film strip which simultaneously facilitates automation of systematic commercial film development and printing.

This object and others which will become more understandable from the description below, of preferred embodiments, can be met, according to one advantageous concept of the invention by using, instead of a simple strip of photographic film, a film strip structure comprising a strip of photographic film comprised of a series of frames, an information carrier strip secured to the strip of photographic film and running alongside the strip of film and bearing information concerning printing and/or development orders and/or information concerning the customers giving the orders, and a pair of flexible protective strips each secured to the information carrier strip along the length of the information carrier strip at a respective one of the two faces of the information carrier strip. Each protective strip extends in direction from the information carrier strip towards the strip of film and overlies and thereby protects a respective one of the two faces of the strip of photographic film. When the film strip structure travels along a predetermined path through an automated printing installation, a device located in the travel path upstream of the actual printing station serves to bend back the protective strips so that the strip of photographic film will pass through the printing station uncovered by the protective strips.

The provision of the protective strips on either face of the information carrier strip serves to protect the information carrier, if the two protective strips are not bent away from the strip of film for the purpose of exposure right in the printing station. Additionally, there is established a reliable coordination between the information on the information carrier and the associated negative frames, since the information carrier strip is cemented, or otherwise secured, to the strip of photographic film.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
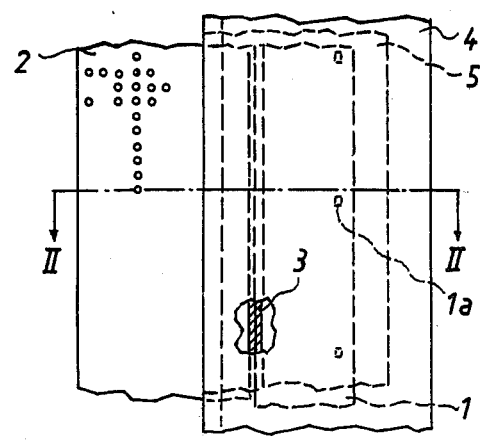
FIG. 1 is a top view looking down upon a protected film strip structure according to the invention.
Figure 2:
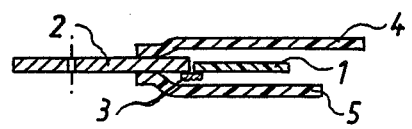
FIG. 2 is a section taken on line II—II of FIG. 1.

In FIGS. 1 and 2, numeral 1 designates a strip of photographic film. The film strip contains a plurality of frames constituting negatives of individual successive pictures made by a still camera, for example. The film strip may be made up of a plurality of discrete film strip sections, belonging to different customers, and glued together to form a very lengthy film strip suitable for automated printing. The frames of the film strip 1 may be miniature-format frames.

The film strip is provided at its right edge portion with perforations 1a each of which has a position associated with a respective one of the frames. These perforations serve to properly position the film in the path of exposure light, both in the photographic camera, in which the film strip is first exposed and in the automatic printing installation.

The film strip 1 is in edge-to-edge abutment with an information carrier strip 2 located adjacent that lateral edge of the film strip 1 remote from the edge provided with the perforations 1a. The information carrier strip 2 can for example be a perforated tape. The information carrier strip 2 bears information concerning, for example, how many copies if any of a particular frame are to be made, the format or formats to be used for the copies made from a particular frame, etc. Additionally, the information carrier strip 2 will bear information identifying the customer placing the printing order as well as an associated internal order number used to facilitate coordination between individual film strip segments and the customers who brought those segments in for printing.

The strips 1 and 2, abutting each other edge-to-edge, are connected together by means of a strip of adhesive 3. The adhesive strip 3 can be an interrupted strip, instead of a continuous strip, to counteract the development of ripples which might otherwise occur due to the different expansion coefficients of the materials of the strips 1, 2 and 3.

Secured to the information carrier strip 2, usually made of high-quality paper, are protective strips 4 and 5. The strips 4 and 5 are cemented or otherwise secured to respective ones of the two faces of the strip 1 at a location spaced a certain distance from the line of abutment between strips 1 and 2. The protective strips 4 and 5, are preferably made of transparent synthetic plastic foil and need be neither very stiff nor completely optically clear and free of streaks. The transparency of the protective strips 4 and 5, serves only to permit the photographer to view and thereby identify the negatives from which he wishes to have prints made. During the actual printing operation, the protective strips 4, 5, which are made of an elastically flexible material, are bent back to expose the strip of photographic film 1. It is advantageous to make the strips 4, 5 very thin, because very thin strips, due to electrostatic attraction, tend to lie tightly against the opposite faces of the film strip 1 and thereby reliably protect the film strip 1 from dust.

The free edges of the protective strips 4, 5 project, in direction from the information carrier strip 2 towards the film strip 1, beyond the free edge of the film strip 1, and the upper protective strip 4 projects, in the aforementioned direction, somewhat beyond the free edge of the lower protective strip 5. The lateral offset between the free edges of the protective strips 4 and 5 serves to facilitate engagement of these edge portions by means, described below, operative for bending the protective strips 4 and 5 back away from the respective faces of the film strip 1 prior to the printing exposure.

Figure 3:
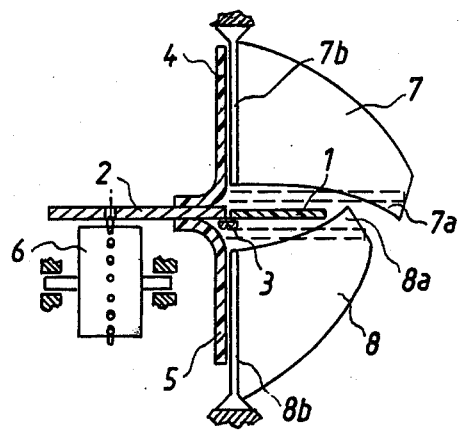
FIG. 3 depicts a first device serving to effect bending back of the protective strips during the printing operation.
Figure 5:
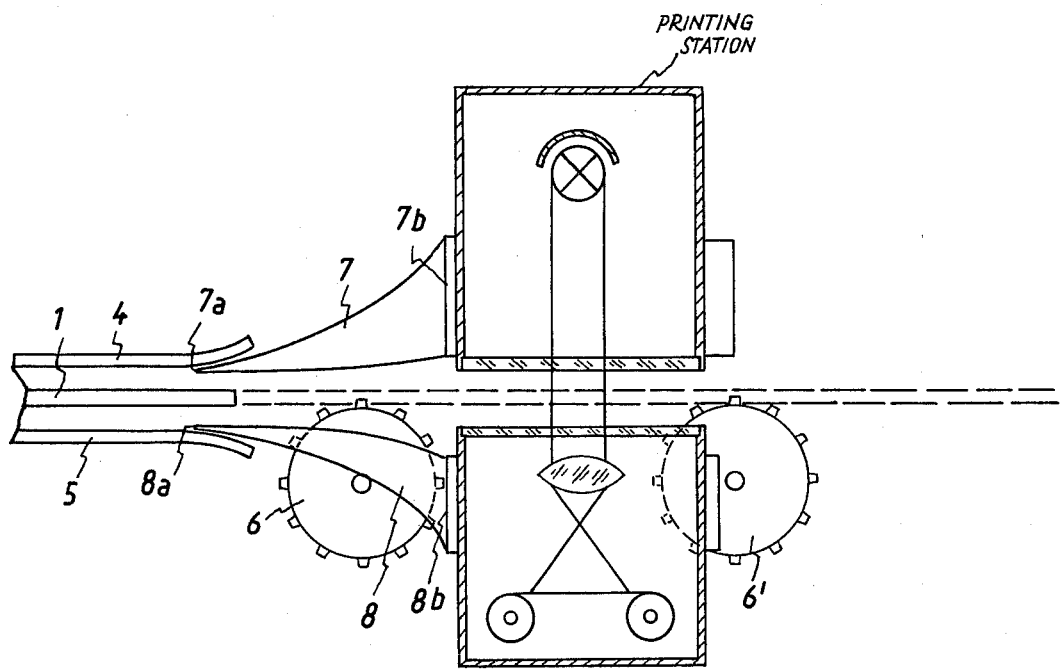
FIG. 5 depicts the arrangement of FIG. 3 in the context of the relevant portions of an automated printing installation.

One device for bending back the protective strips 4, 5 is schematically depicted in FIG. 3 and depicted in FIG. 5 in the context of an automated film printing installation. In FIG. 3, the cross-section of the film strip structure 1 – 5 of FIG. 2 is shown again, but the unflexed positions of the protective strips 4 and 5 are indicated only by broken lines. In their solid-line positions, the protective strips 4 and 5 extend perpendicular to the plane of the film strip 1, so as to expose the image-bearing part of the film strip 1 for the printing or copying operation. In the path of travel of the film strip structure 1 – 5, but upstream of the actual printing station, there is arranged a toothed wheel 6 whose teeth engage the perforations in the information carrier strip 2 for the purpose of driving the film strip structure 1 – 5. A similar toothed wheel 6' is located downstream of the printing station (see FIG. 5). The toothed wheels 6, 6' together constitute means for guiding the film strip structure 1 – 5 through the printing installation. There is furthermore provided a (non-illustrated) reading device for reading the perforations in the tape or strip 1 and controlling the printing operations in dependence upon the read information. At the printing station, the film strip 1 lies upon a glass plate or other suitable support, to properly position the negative frame for printing. Light from a light source and a cooperating reflector is passed through the negative frame and focussed onto printing paper in per se conventional manner not requiring explanation.

Upstream of the printing station there is arranged a structure comprised of two plowshare-shaped deflecting parts 7 and 8, shown in FIG. 3 and schematically depicted in side view in FIG. 5. In FIG. 3, it should be understood that the travel direction of the film strip structure 1 – 5 is perpendicularly into the plane of the Figure. The upper deflecting part 7 is provided with a pointed bottom portion 7a, whereas the lower deflecting part 8 is provided with a pointed upper portion 8a. Furthermore, the deflecting parts 7 and 8 are provided with respective vertical edge portions 7b and 8b.

It is to be understood that the pointed end portions 7a, 8a constitute the upstreammost portions of the deflecting parts 7, 8 (i.e., the pointed end portions 7a, 8a constitute the portions of the deflecting parts 7, 8 which are closest to the viewer looking at FIG. 3). The vertical edge portions 7b, 8b constitute the rearmost or downstreammost portions of the deflecting parts 7, 8 (i.e., the vertical edge portions 7b, 8b constitute the portions of the deflecting parts 7, 8 which are farthest from the viewer looking at FIG. 3). Intermediate the upstream portions 7a, 8a and the downstreammost portions 7b, 8b the surface of each plowshare-shaped deflecting part 7, 8 is warped, undergoing a gradual transition from horizontal to vertical proceeding downstream or deeper into the picture plane of FIG. 3.

As the film strip structure 1 – 5 is fed towards the deflecting structure 7, 8, in direction into the picture plane of FIG. 3, the pointed end portion 7a of part 7 slips underneath the upper protective strip 4, whereas the pointed end portion 8a of the part 8 slips over the lower protective strip 5. As the film strip structure 1 – 5 is fed further, the leading end portions of the protective strips 4 and 5 are increasingly bent upwards and downwards, respectively, away from the respective faces of the film strip 1. By the time the leading end portion of the film strip structure 1 – 5 has moved a certain distance past the deflecting structure 7, 8, the portions of the protective strips 4, 5 in contact with the deflecting structure 7, 8 and also the portions of the strips 4, 5 somewhat downstream of the deflecting structure 7, 8, will have the illustrated vertical orientation. In FIG. 5, the deflecting structure extends back to a location downstream of the printing station to assure that the protective strips 4, 5 are bent back away from the film strip 1 during the entire travel of the film strip 1 through the printing station. Downstream of the printing station, the deflecting structure 7, 8 ends, allowing the elastically flexible strips 4, 5, to move back, under the force of their internal flexural stress, back into contact with the respective faces of the film strip 1.

Figure 4C:
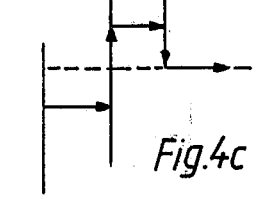
FIGS. 4a, 4b and 4c illustrate a further device for bending back the protective strips.
Figure 4A:
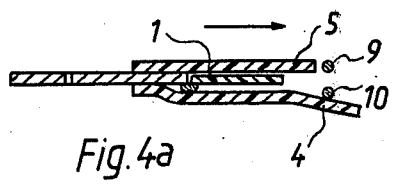
Figure 4B:
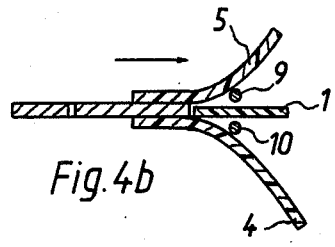

Another structure for effecting the bending back of the protective strips 4, 5 during the feeding-in or threading-in of the film strip structure 1 – 5 into the printing station is depicted in FIGS. 4a, 4b and 4c. The structure in question is essentially comprised of two wire loops 9, 10 spaced apart in direction perpendicular to the plane of the film strip 1 to define an intermediate slit which is substantially coincident with the plane of the film strip 1, when the film strip has been threaded and is travelling through the printing station. FIG. 4a depicts the start of the threading operation.

Initially, the film strip structure 1 – 5 is moved in the direction of the arrow in FIG. 4a, i.e., in a plane parallel to the general plane of the film strip 1 and in a direction perpendicular to the elongation of the film strip structure. The free edge portion of the lower protective strip 4, which projects beyond the free edge portion of the upper protective strip 5, abuts against the lower wire loop 10 and is deflected downward away from the film strip 1 by moving the film strip structure 1 - 5 as a whole upwards. By simultaneously moving the film strip structure 1 - 5 further rightwards and upwards, the free edge portion of the upper protective strip 5 passes over the upper wire loop 9, and by moving the entire film strip structure downwards, the upper protective strip 5 is bent upwards somewhat. Thereafter, the film strip structure 1 - 5 is moved further to the right, centered, so that the film strip 1 enters into the guide slit intermediate the wire loops 9, 10. As the film strip structure is moved still further to the right, the protective strips 4, 5 are bent more and more away from the film strip 1, until finally the film strip 1 is completely uncovered and in the proper position for being transported through the printing station. FIG. 4c graphically depicts the movements just described, namely first the rightwards movement to cause loop 10 to slip over strip 4, the upwards movement to cause strip 4 to bend down and strip 5 to move above the level of loop 10, the rightwards movement to cause loop 9 to slip under strip 5, the downwards movement to cause strip 5 to be bent upwards and the film strip structure to assume a centered position relative to the slit intermediate loops 9 and 10, and finally the rightwards movement causing film strip 1 to enter the aforementioned slit and causing the protective strips 4, 5 to be bent all the way back until they fully uncover the film strip 1.

The operation of the aforedescribed arrangements is as follows:

The information carrier strip 2 and the protective strips 4, 5 are attached to the film strip 1 as the film is discharged upon the completion of the first making of prints from the film strip. Any known machine for cementing such strips to each other can be used. In such form the film strip structure 1 - 5 is returned to the photographer, either as a long roll or as a four segment unit. The photographer then determines whether, besides the complete set of prints furnished to him, he desires additional prints to be made from certain negatives.

If the photographer does desire additional prints, he can provide an indication to that effect on the attached strip 2, either in handwriting or for example by punching out partially pre-perforated code holes or the like. The film strip structure 1 - 5 with the information carrier strip 2 bearing the information concerning which negatives are to be used to make additional prints, how many prints of each such negative are desired, what sizes the prints should be, etc. as well as the customer's address and/or the name of the retail establishment to which he returns the film, an order number, etc., is then returned to the printing laboratory where the orders are sorted according to picture format and film strips cemented together to form a lengthy film strip suitable for automatic processing. In the printing installation, the bending back of the protective strips 4 and 5 is performed in the aforedescribed manner. Downstream of the printing station, the protective strips 4, 5, due to their internal flexural stress, return to their initial positions in which they cover and thereby protect the respective faces of the film strip 1. After passing through the automatic printer, the very long film strip can be cut at the cementing locations to reform the original film strips sent in by the individual customers, and such film strips together with the additional prints made from selected negatives thereof are returned to the customers.

With another organizational set-up of the printing laboratory, the four-component film strip structure is fed directly to the printing installation. In such event it is preferred to use the deflecting structure shown in FIG. 4 for bending back the protective strips 4, 5 to uncover the film strip 1. The insertion of the film strip structure and the movements thereof necessary to cause the deflecting structure of FIG. 4 to effect the requisite bending back, are preferably performed by hand. However, the reading of the information on the information carrier strip 2 can still be done by mechanical means.

The inventive concept is not limited to the illustrated exemplary embodiments. For example, the bending back of the protective strips 4, 5 from the film strip 1 could be facilitated by providing the edges of the strips with alternating recesses or alternately arranged holes so that a correspondingly designed gripping mechanism can spread apart the protective strips 4 and 5. If the protective strips 4 and 5 and the film strip 1 lie very closely against one another, then use could be made of a pneumatic suction arrangement for effecting the bending back of the protective strips.

It will be understood that each of the elements described above, or two or more together may also find a useful application in other types of constructions and designs, differing from the types described above.

While the invention has been illustrated and described as embodied in the protection of film strips comprised of discrete negative frames, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A protected photographic film strip structure, comprising, in combination, a strip of photographic film comprised of a series of frames; an information carrier strip secured to said strip of photographic film and running alongside said strip of photographic film and bearing information concerning the frames; and a pair of elastically flexible protective strips each secured to said information carrier strip along the length of said information carrier strip at a respective one of the two faces of said information carrier strip, each protective strip extending in direction from said information carrier strip towards said strip of photographic film and overlying and thereby protecting a respective one of the two faces of said strip of photographic film.

2. A film strip structure as defined in claim 1, wherein said protective strips are of transparent material.

3. A film strip structure as defined in claim 1, wherein one of said protective strips extends in direction from said information carrier towards said strip of photographic film beyond said strip of photographic film, and wherein the other of said protective strips extends in direction from said information carrier towards said strip of photographic film beyond said one of said protective strips.

4. A film strip structure as defined in claim 1, wherein said strip of photographic film is provided along the lateral edge thereof remote from said information carrier strip with perforations, and wherein said strip of photographic film along the lateral edge thereof proximal to said information carrier strip is in edge-to-edge abutment with a lateral edge of said information carrier strip, further including an elongated adhesive strip running along the adjoining edges of and joining together said strip of photographic film and said information carrier strip.

5. In an installation for making prints from exposed photographic film and adapted to process a film strip structure comprised of a strip of photographic film comprised of a series of frames, an information carrier strip secured to the strip of photographic film and running alongside the strip of photographic film and bearing information concerning the frames, and a pair of elastically flexible protective strips each secured to the information carrier strip along the length of the information carrier strip at a respective one of the two faces of the information carrier with each flexible protective strip in normal unflexed condition extending in direction from the information carrier strip towards the strip of photographic film and overlying and thereby protecting a respective one of the two faces of the strip of photographic material, in combination: a printing station including illuminating means for illuminating the film strip; and means for guiding the film strip structure along a predetermined path passing through said printing station and including means upstream of said printing station for bending the protective strips away from the respective opposite faces of the film strip so that the film strip passes through the printing station not covered by the protective strips whereby the illuminating light of said illuminating means can pass through the film strip without being blocked by the protective strips.

6. In an installation as defined in claim 5, wherein said means for bending the protective strips away from the film strip comprises a structure including two plowshare-shaped deflecting parts positioned in said path upstream of said illuminating means, said parts being configured and positioned to engage respective ones of the protective strips as the film strip structure is fed towards said plow-shaped deflecting parts and increasingly bend the strips away from the film strip and hold the bent away protective strips generally perpendicular to the plane of the strip of photographic film as the strip of photographic film passes through said printing station.

7. In an installation as defined in claim 5, wherein said means for bending the protective strips away from the film strip comprises a structure including two parts spaced apart in direction transverse to the plane of the strip of photographic film to define an intermediate gap generally coincident with the plane of the strip of film, said parts being so configured and positioned that when the film strip structure is fed into said parts with a combination of movements transverse to the plane of the strip of film and transverse to the elongation of the film strip structure said parts engage respective ones of the protective strips and cause the protective strips to be bent away from the respective faces of the strip of film.

* * * * *